United States Patent [19]

Mathis et al.

[11] Patent Number: 4,910,539
[45] Date of Patent: Mar. 20, 1990

[54] RF FREQUENCY FIBER OPTIC POWER COUPLING DEVICE

[75] Inventors: Ronald F. Mathis; Andrew P. Riser, both of Ramona, Calif.

[73] Assignee: General Dynamics Corporation, Electronics Division, San Diego, Calif.

[21] Appl. No.: 289,733

[22] Filed: Dec. 27, 1988

[51] Int. Cl.$^4$ .............................. G02B 6/26; G02B 6/42
[52] U.S. Cl. .................................................. 350/96.15
[58] Field of Search ...................................... 350/96.15

[56] References Cited

U.S. PATENT DOCUMENTS

| | | | |
|---|---|---|---|
| 4,522,461 | 6/1985 | Mannschke | 350/96.15 |
| 4,606,020 | 8/1986 | Ruffin | 350/96.15 |
| 4,732,449 | 3/1988 | Fan | 350/96.15 |
| 4,733,931 | 3/1988 | Fan | 350/96.15 |
| 4,776,659 | 10/1988 | Mruk | 350/96.15 |

Primary Examiner—William L. Sikes
Assistant Examiner—Robert E. Wise
Attorney, Agent, or Firm—Brown, Martin, Haller & McClain

[57] ABSTRACT

A fiber optic power coupling device such as a power summer, power divider or star coupler comprises a segment of multimode optical fiber having an input mirror at one end and an output mirror at the opposite end. One or more inputs at the input end of the fiber segment direct an equivalent number of input, intensity modulated light signals into the fiber and one or more outputs at the output end direct a corresponding number of output signals out of the fiber. Where there is one input and a plurality of outputs, the device acts as a power divider. Where there are a plurality of inputs and one output, the device acts as a power summer. Where there are a plurality of inputs and a plurality of outputs, the device acts as a star coupler.

7 Claims, 1 Drawing Sheet

RF FREQUENCY FIBER OPTIC POWER COUPLING DEVICE

BACKGROUND OF THE INVENTION

The present invention relates generally to power coupling devices such as power summers, power dividers and star couplers, and more particularly to fiber optic power coupling devices.

Fiber optic power summers, power dividers and star couplers utilizing fused single mode fibers are commercially available. However, uniformity, modal dependence and insertion loss are continuing problems. In addition, it is not possible to sum single mode fiber outputs because of interference effects, particularly if the signals are close in frequency.

In my U.S. Pat. No. 4,577,924, an optical RF bandpass filter was described which consisted of a multi-mode optical fiber segment having reflecting mirrors on each end so that it functioned as a resonant cavity with respect to a particular modulation frequency when the length of the fiber was equal to one-half of the modulation wavelength of light injected into the fiber. This type of filter may be used in various signal processing applications, for example in electronic intelligence receivers, data busses, fast frequency hopping modems, and so on.

SUMMARY OF THE INVENTION

It is an object of the present invention to provide an improved fiber optic power coupling device.

According to the present invention, a power coupling device is provided which comprises a segment of optical fiber having a first mirror at one, input end of the fiber segment and a second mirror at the opposite, output end of the fiber, an input assembly at the input end of the fiber for directing n input, intensity modulated light signals into the fiber and an output assembly at the output end for directing m output light signals out of the fiber, where at least one of the values n or m is greater than one. In one example, the fiber segment has one input and a plurality of outputs, in which case it functions as a power divider. In another example, plural inputs and a single output are provided, so that the device comprises a power summer. In yet another example, the fiber segment has plural inputs and outputs to provide a star coupler.

In each case, the inputs and outputs are preferably provided by an appropriate number of holes in the first and second mirrors, with the total area of the output holes being greater than that of the input holes. This will reduce losses as a result of back reflections.

Preferably, the fiber segment is designed to act like a low pass filter for each input signal. The length of the fiber segment is preferably of the order of one-fourth or less of the modulation wavelength of the highest frequency input signal.

This arrangement may be used in various fiber optic networks such as data busses, local area networks and beamforming networks. It reduces or overcomes modal problems in providing summing or dividing of signals independent of input mode distributions. It will reduce or avoid interference effects, since it will mix the signals in a non-coherent way to produce an average.

BRIEF DESCRIPTION OF THE DRAWINGS

The present invention will be better understood from the following detailed description of same preferred embodiments of the invention, in which like reference numerals refer to like parts, and in which.

DESCRIPTIONS OF THE PREFERRED EMBODIMENTS

Figure 1:
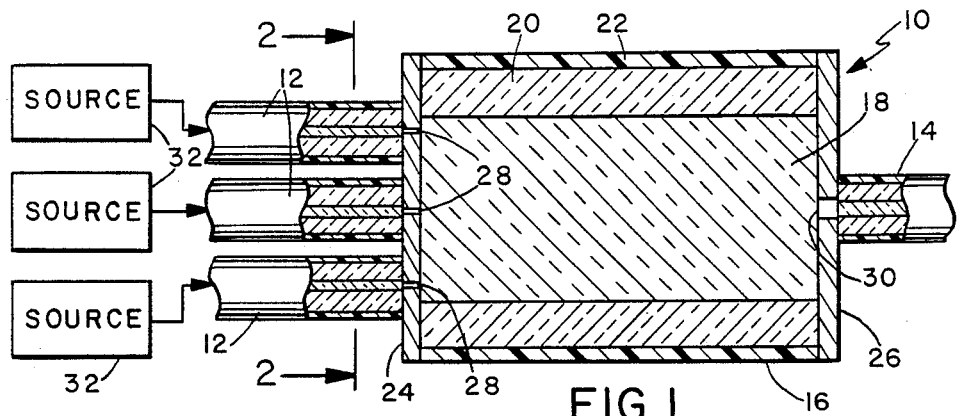
FIG. 1 is a sectional view of a power summing device according to a first embodiment of the present invention.
Figure 2:
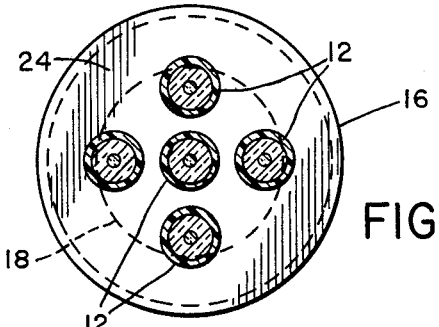
FIG. 2 is a sectional view of the input end of the device on lines 2—2 of FIG. 1.

FIGS. 1 and 2 of the drawings illustrate a fiber optic power coupling device 10 according to a first embodiment of the present invention. The device 10 comprises a power summer for summing a series of input signals on lines 12 and producing a single output on line 14. FIG. 2 shows one of the input fibers 12 positioned in the center of the device. In many instances, however, it will be preferred to have all input or output fibers offset from the center to improve mode mixing.

The power summer 10 basically comprises a fiber optic RF filter, and includes a segment 16 of multi-mode optical fiber comprising a core 18, a cladding 20 of different refractive index surrounding the core, and a buffer layer or jacket 22. A first, input mirror or reflective coating 24 is applied at one end of the segment 16 while a second, output mirror 26 is formed at the opposite end of segment 16. The mirrors may be applied by any appropriate means, for example by deposition after the end of the fiber segment has been ground flat and polished.

One fiber optic RF bandpass filter is described in my U.S. Pat. No. 4,577,924 entitled Optical Recursive Filter. The power coupling device in the embodiment illustrated in FIG. 1 utilizes this type of filter but with several inputs instead of a single input. Also, the filter is designed so that it does not function as a resonant cavity to any of the input signals, but instead mixes the input signals together to produce an average of all the signals at the output, as explained in more detail below.

Input mirror 24 has a series of input holes 28 corresponding to the number of inputs to be summed arranged symmetrically around the center axis of core 18 as illustrated in FIG. 2. A single output hole 30 is provided in output mirror 26. Input and output lines 12 and 14 may comprise any suitable means for directing light signals into and out of the fiber segment. In the preferred embodiment illustrated, each input line comprises an input optical fiber suitably coupled to the input end of the fiber segment in alignment with a respective one of the input holes. Similarly, the output line 14 comprises an output optical fiber coupled to the output end of the fiber segment in alignment with the output hole 30. The input and output fibers may be single mode or multimode.

Each input fiber is coupled to a respective modulated light source 32 for producing an intensity modulated light signal dependent on an input electrical RF signal.

Fiber segment 16 is preferably arranged to act as a low pass filter to all incoming light signals. In other words, the length of segment 16 will be short relative to the wavelength of the incoming signals, suitably of the order of no greater than one-fourth of the shortest wavelength signal. Thus it will not resonate at any of the incoming signal frequencies, but will instead mix the signals in a non-coherent way to produce an average output signal.

The area of the output hole is relatively large compared to the total area of the input holes. This will reduce insertion losses as a result of back propagation, since a large hole will intercept more light than a small hole and vice versa. Thus a larger percentage of the signal will travel out via output hole 30 than will travel back out of input holes 28. The output light signal is connected to a suitable known output device (not shown) for converting the optical signal back into an electrical RF signal.

The holes in the input and output mirrors may be formed by chemical etching or laser burning and may typically have diameters in the range of 2 to 15 percent of the core diameter, with the input hole diameters being at the lower end of the range while the output hole diameter is at the upper end of the range. For example, if the core diameter is 1000 microns, the hole diameters are preferably in the range of 20 to 150 microns. However, the only real constraint on the hole dimensions is that the output hole area is larger than the total input hole area.

Instead of the optical fiber inputs shown in FIG. 1, the input light signals may be injected directly into the filter or fiber segment by means of an optical waveguide or by direct coupling to the outputs of modulated light sources providing the input signals, such as laser diode outputs.

The various light signals entering the filter through input holes will undergo diffraction, resulting in multimodal propagation of the light signals such that the light becomes noncoherent. The various light signals will become mixed in the cavity, resulting in the output of an average of all the input signals at the single output hole. Thus the device acts as a power summer.

Figure 3:
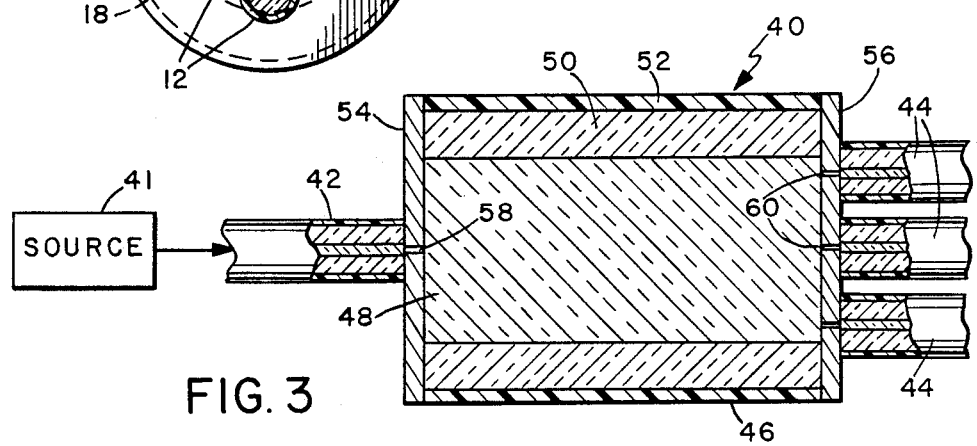
FIG. 3 is a view similar to FIG. 1 showing an alternative embodiment of the invention comprising a power divider.

FIG. 3 of the drawings illustrates an alternative embodiment of the invention in which device 40 comprises a power divider for dividing a single input, intensity modulated light signal from source 41 on line 42 into multiple outputs on lines 44. As in FIG. 1, the device basically comprises an optical RF filter comprising a segment 46 of multimode optical fiber having a central core 48 surrounded by a cladding 50 of different refractive index to the core and an outer buffer layer or jacket 52. Fiber segment 46 may be of the type of fiber described above in connection with FIG. 1. Input and output mirrors or reflective coatings 54, 56 are applied to the opposite ends of the fiber segment as in the first embodiment. However, rather than multiple input holes and a single output hole, the device in FIG. 3 has a single input hole 58 in input mirror 54 and multiple output holes 60 in output mirror 56. Output holes 60 may be arranged symmetrically around the central axis of core 48, as illustrated in FIG. 2 for the input holes of power summer 10. However, alternative arrangements of the output holes, including asymmetrical arrangements or arrangements in which some holes are closer to the center axis than others, may be useful in some applications. In the preferred embodiment illustrated, input line 42 and output lines 44 each comprise optical fibers suitably coupled to the respective input and output holes. However, alternative input and output devices such as directional couplers or optical waveguides may be used.

As in the first embodiment, the length of the fiber segment is arranged such that the device will act as a low pass filter to the incoming light signal. Preferably, the length of the fiber segment will be one-fourth or less of the input light signal modulation frequency. The input and output holes may be of suitable size, but are preferably in the range given above in connection with the first embodiment, and are selected such that the total output hole area is greater than the input hole area, to reduce insertion losses as a result of back reflections.

The light signal entering the filter will undergo diffraction, resulting in multimodal propagation of the light within the fiber segment, such that the light becomes noncoherent. Light exits through the holes in output mirror, so that the device acts as a power divider.

Figure 4:
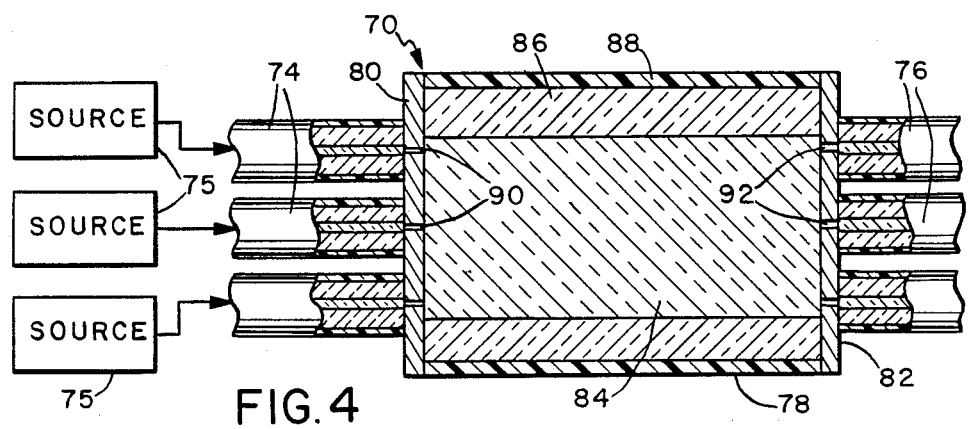
FIG. 4 illustrates a third embodiment in which the device comprises a star coupler.

FIG. 4 illustrates alternative embodiment, in which device 10 comprises a star coupler for connecting input on lines 74 to a number of outputs on lines 76. The number of inputs will typically be different from the number of outputs. As in the previous embodiments, the device basically comprises an optical RF filter comprising a multimode fiber optic segment 78 having an input mirror 80 at one end and an output mirror 82 at the opposite end. The fiber segment 78 consists of a core 84 surrounded by cladding 86 and buffer layer 88, and may be of the same general type as described above in connection with FIG. 1.

Input mirror 80 has a number of holes 90 corresponding to the desired number of inputs, while output mirror 82 has a number of output holes 92 corresponding to the desired number of outputs. In each case, the holes may be arranged symmetrically around the center of the core 84 as illustrated in FIG. 2, although this is not essential. The only constraint is that the total area of the input holes is less than the total area of the output holes.

As in the first two embodiments, the input lines 74 and output lines 76 consist of multimode or single mode optical fibers. The input intensity modulated light signals may each be provided by suitable modulated light source 75 such as a laser diode. The light sources may alternatively be coupled directly to the input holes or connected via optical waveguides.

As in the first embodiment of the invention illustrated in FIG. 1, the input light signals in the filter will be mixed in a noncoherent way before exiting the filter via output holes 92. The filter is preferably designed so that it will not resonate at any of the input signal modulation frequencies, unless a bias on one of the input signals is desired. Preferably, the length of the fiber segment will be one-fourth or less of the shortest input signal modulation wavelength. This will ensure that all incoming signals will be mixed equally in the filter cavity.

The power coupling device of this invention can be used in various fiber optic networks such as data busses, local area networks and beamforming networks. It provides an improved, simple and compact device for summing several optical signals or dividing one or more input optical signals into several signals, which avoids or reduces the problems of uniformity, modal dependence and insertion losses which are prevalent in standard fused optical fiber power couplers. It also provides the summation of single mode fiber outputs without any significant interference effects.

Although some preferred embodiments of the invention have been described above by way of example only, it will be understood by those skilled in the field that modifications may be made to the disclosed embodiments without departing from the scope of the invention, which is defined by the appended claims.

We claim:

1. A fiber optic power coupling device, comprising:
   a fiber optic RF filter comprising segment of multimode optical fiber having a first mirror at one, input end and a second mirror at the opposite, output end of the fiber segment;
   input means at the input end of the filter for directing n input, intensity modulated light signals into the fiber segment; and
   output means at the output end of the filter for directing m output signals out of said fiber segment;
   at least one of the values n and m being greater than one.

2. The device as claimed in claim 1, wherein the filter has a plurality of inputs and a single output.

3. The device as claimed in claim 1, wherein the filter has a single input and a plurality of outputs.

4. The device as claimed in claim 1, wherein the filter has a plurality of inputs and a plurality of outputs.

5. The device as claimed in claim 1, wherein the first mirror has n input holes and the second mirror has m output holes, the input means comprising n input optical fibers coupled to respective input holes and the output means comprising m output optical fibers coupled to the respective output holes.

6. The device as claimed in claim 5, wherein the ratio of total cross-sectional area of output holes to total cross-sectional area of input holes is always greater than one.

7. The device as claimed in claim 1, including optical source means for generating at least one intensity modulated optical signal for each of the n inputs, the length of the fiber segment being no greater than one-fourth of the wavelength of the input signal with the highest modulation frequency.

* * * * *